United States Patent [19]

Nielinger et al.

[11] 4,118,364

[45] Oct. 3, 1978

[54] REINFORCED POLYHEXAMETHYLENE ISOPHTHALAMIDE

[75] Inventors: Werner Nielinger; Bert Brassat; Hugo Vernaleken, all of Krefeld, Germany

[73] Assignee: Bayer Aktiengesellschaft, Germany

[21] Appl. No.: 818,093

[22] Filed: Jul. 22, 1977

[30] Foreign Application Priority Data

Oct. 20, 1976 [DE] Fed. Rep. of Germany ....... 2647310

[51] Int. Cl.² ............................................. C08L 77/06
[52] U.S. Cl. .................................................. 260/37 N
[58] Field of Search ...................................... 260/37 N

[56] References Cited

U.S. PATENT DOCUMENTS

| 3,344,107 | 9/1967 | Miller | 260/37 N |
|---|---|---|---|
| 3,751,394 | 8/1973 | Hermann | 260/37 N |
| 3,810,861 | 5/1974 | Tacke et al. | 260/37 N |

*Primary Examiner*—Lewis T. Jacobs
*Attorney, Agent, or Firm*—Connolly and Hutz

[57] ABSTRACT

Reinforced amorphous polyamides of isophthalic acid and hexamethylene diamine and articles thereof.

7 Claims, No Drawings

REINFORCED POLYHEXAMETHYLENE ISOPHTHALAMIDE

It is known that the mechanical properties of thermoplasts can be considerably improved by the addition of reinforcing materials, especially glass fibres. Glass-fibre-reinforced polyamides are distinguished from non-reinforced polyamides by their high elasticity modulus, their greater hardness, their higher dimensional stability under heat and by their increased tensile and flexural strength.

In the case of partially crystalline polyamides additionally the linaer expansion with increasing temperature is also favourable affected by reinforcement. The linear expansion of reinforced polyamide-6 is considerably lower than that of the non-reinforced material.

The use of non-crystalline polyamides instead of partially crystalline polyamides is occasionally preferred because non-crystalline polyamides have the advantage of lower shrinkage on hardening. In contrast to the partially crystalline polyamides, however, the linear expansion with increasing temperature of the amorphous polyamides is not improved by reinforcement.

It has now surprisingly been found that the linear expansion as a function of temperature of shaped articles produced of amorphous polyamides of isophthalic acid and hexamethylene diamine is also improved by the addition of reinforcing material, as in the case of the partially crystalline polyamides.

Accordingly, the present invention provides reinforced amorphous polyamides of isophthalic acid and hexamethylene diamine and articles thereof which show negligible linear expansion and hence improved dimensional stability with increasing temperatures.

Preferably the polyamides of isophthalic acid and hexamethylene diamine have a relative viscosity of from 2.0 to 4.0, more preferably from 2.4 to 3.5, as measured on a 1% solution in m-cresol at 25° C. in an Ubbelohde viscosimeter. The inventive polyamides contain from 5 to 50% by weight and preferably from 20 to 40% by weight of reinforcing material, based on the mixture of polyamide and the reinforcing material.

Suitable reinforcing materials are preferably fibres such as, boron-, Al-oxide-, C-fibres and whiskers and asbestos fibres, more preferably glass fibres and/or glass beads.

The glass fibres are made of alkali-free boron-silicate glass (E-glass) or alkali-containing C-glass. The thickness of the fibres is preferably on average between 3 $\mu$m and 30 $\mu$m. It is possible to use both long fibres with an average length of from 5 to 50 mm and also short fibres with an average filament length of from 0.05 to 5 mm. In principle, any standard commercial-grade fibres, especially glass fibres, may be used. Glass beads ranging from 5 $\mu$m to 50 $\mu$m in diameter may also be used as reinforcing material.

Various methods are known for producing the reinforced polyamide. For example, so-called rovings, endless glass fibre strands, are coated with the polyamide melt and subsequently granulated. The cut fibres or the glass beads may also be mixed with granulated polyamide and the resulting mixture melted in a conventional extruder, or alternatively the fibres may be directly introduced into the polyamide melt through a suitable inlet in the extruder.

It is also possible to polycondense isophthalic acid and hexamethylene diamine in the presence of the reinforcing material.

The reinforced polyamides may additionally contain additives such as pigments, lubricants, mould-release agents and adhesion promoters.

The reinforced polyamides are particularly suitable for producing articles with high dimensional stability at elevated temperatures, as for example for the production of valve housings and valve bodies for measuring instruments and pumps, meter components, switch components, gearwheels and control elements. These articles can be manufactured by known moulding processes, especially by injection moulding or by means of an extruder.

EXAMPLE 1

65 parts by weight of polyhexamethylene isophthalamide with a relative viscosity of 2.55 (as measured on a 1% solution of the polyamide in m-cresol at 25° C. in an Ubbelohde viscosimeter) and 35 parts by weight of short glass fibres with a length of about 230 $\mu$m and a diameter of about 10 $\mu$m are uniformly introduced by weigh feeders into a twin-screw extruder (Werner & Pfleiderer type ZSK 83). The material is homogenised at 260° C. and run off in the form of a strand through a water bath, granulated and subsequently dried. The polyamide is then processed into standard test specimens in a screw injection-moulding machine at a temperature of 280° C. The injection mouldings show a uniform distribution of the glass fibres and a smooth surface. They are highly translucent.

The linear thermal expansion coefficients per degree determined according to VDE 0304 are as follows:

reinforced polyhexamethylene isophthalamide: $22.10^{-6}$ non-reinforced polyhexamethylene isophthalamide: $67.10^{-6}$ By contrast, the coefficients of linear thermal expansion of a comparable amorphous polyamide of, for example, terephthalic acid and the isomer mixture of 2,2,4- and 2,4,4-trimethyl hexamethylene diamine are as follows (according to publications of Dynamit Nobel AG):

reinforced polyamide: $70.10^{-6}$
non-reinforced polyamide: $60.10^{-6}$

EXAMPLE 2

A reinforced polyamide is produced as described in Example 1 from 60 parts by weight of polyhexamethylene isophthalamide with a relative viscosity of 2.61 and 40 parts by weight of glass fibres with a diameter of about 10 $\mu$m and a length of about 6 mm. The coefficient of linear thermal expansion per degree of this product is $20.10^{-6}$.

EXAMPLE 3

1016 g of a salt of isophthalic acid and hexamethylene diamine, 11.5 g of hexamethylene diamine (2.75% by weight, based on the diamine needed for compensating the losses of diamine during polycondensation), 8.79 g of benzoic acid (2 mole percent, based on the salt) and 222 g of glass fibres with an average length of about 230 $\mu$m and a diameter of about 10 $\mu$m are mixed. The resulting mixture is heated to 220° C. (bath temperature). Polycondensation is carried out under nitrogen with stirring for 2 hours at this temperature and then for 3 hours at 270° C. A uniform clouded melt is obtained. After cooling, the polyamide is granulated, after-dried and injection moulded into mouldings. The polyamide has a relative viscosity of 2.33, measured in the same way as in Example 1. The coefficient of linear thermal expansion per degree amounts to $37.10^{-6}$.

What we claim is:

1. Polyhexamethylene isophthalamides containing from 5 to 50%, based on the mixture of polyamide and reinforcing material, by weight of a reinforcing material.

2. Polyhexamethylene isphthalamides as claimed in Claim 1, wherein glass fibres, glass beads or a mixture thereof are used as reinforcing material.

3. Polyhexamethylene isophthalamides as claimed in claim 1, containing from 20 to 40%, based on the mixture of polyamides and reinforcing material, by weight of the reinforcing material.

4. Polyhexamethylene isophthalamides as claimed in claim 1, wherein the polyamides have a relative viscosity of from 2.0 to 4.0.

5. Shaped articles comprising reinforced polyhexamethylene isophthalamides as claimed in claim 1.

6. Shaped articles comprising reinforced polyhexamethylene isophthalamides as claimed in claim 2.

7. Polyhexamethylene isophthalamides as claimed in claim 1 wherein the reinforcing material comprises fibers or whiskers of boron, aluminum oxide or carbon or mixtures thereof.

* * * * *